United States Patent Office 3,168,845
Patented Feb. 9, 1965

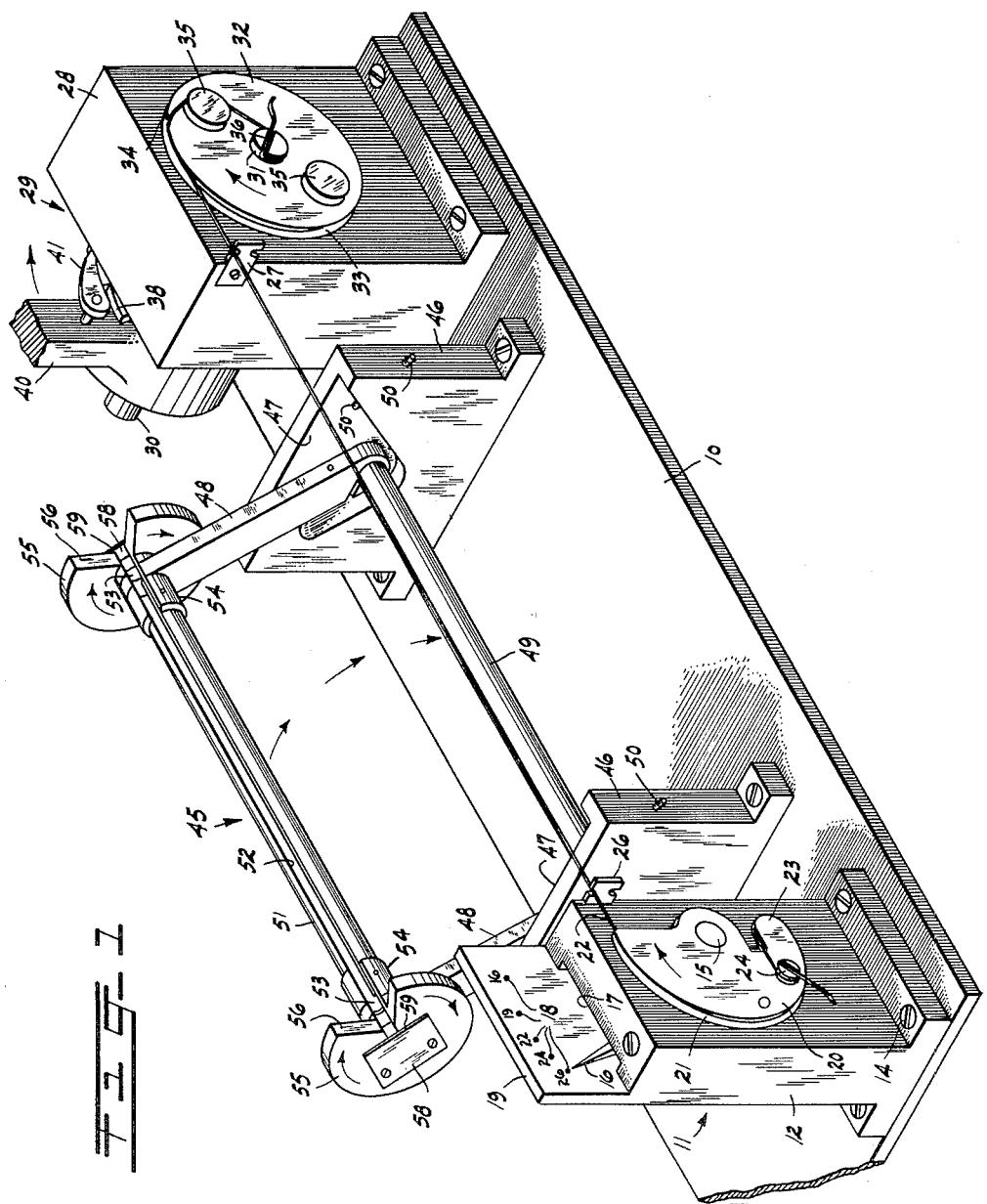

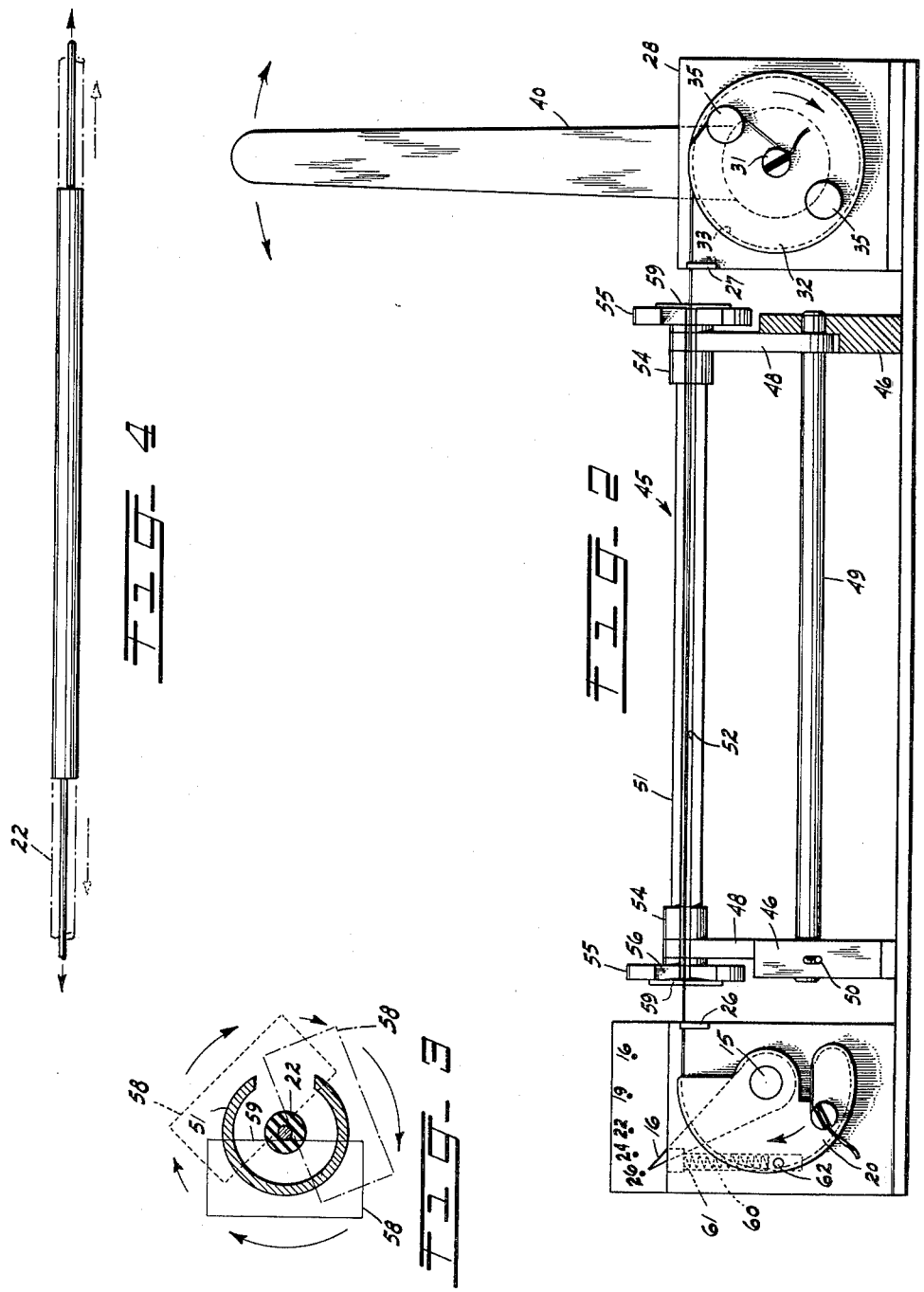

3,168,845
APPARATUS FOR STRIPPING MEASURED
LENGTHS OF INSULATION
Frederick W. Kleiner, Leonia, George T. Kuwayama, Scotch Plains, and Frank Wahl, North Bergen, N.J., assignors to Western Electric Company, Incorporated, New York, N.Y., a corporation of New York
Filed Nov. 13, 1963, Ser. No. 323,299
4 Claims. (Cl. 81—9.51)

This invention relates to apparatus for stripping measured lengths of insulation, particularly expanded insulation, from wires.

In the manufacture of electrical conductors of various gauges having expanded plastic insulation thereon, it is important to make periodic checks of the insulation to determine if it contains the proper mixture of gas and plastic material. This may be accomplished by weighing predetermined lengths of the insulation. However, to accomplish this result, the insulation of measured lengths must be removed from the wires of various gauges.

An object of the invention is an apparatus which, though simple in structure, is highly efficient in stripping measured lengths of insulation from wires of different gauges.

In accordance with the object the apparatus comprises an indicating unit having a clamp for one end of the insulated wire mounted thereon, a holder for the other end of the wire adapted to cooperate with the clamp and unit to pre-tension the insulated wire in a given line, cutters operable to make end cuts of the insulation predetermined distances apart, and means to move the holder relative to the clamp to first pre-tension the insulated wire and, after the end cuts are made, cause stretching of the wires to thereby reduce the wire in size to free the measured length of insulation from the wire, additional pull on the wire causing it to break completely freeing the measured length of insulation.

Other objects and advantages will be apparent from the following detailed description when considered in conjunction with the accompanying drawings wherein:

FIG. 1 is an isometric view of the apparatus;

FIG. 2 is a front elevational view of the apparatus, a portion thereof shown in section;

FIG. 3 is a sectional view of the cutting unit of the apparatus illustrating various positions during its operation; and FIG. 4 is a top plan view of an insulated wire with the insulation cut to a predetermined length.

In the present illustration, the apparatus is composed of a base 10 upon which a unit 11 is mounted. The unit 11 includes a housing 12 mounted at 14 on the base 10 and supporting a spindle 15 for rotation. A pointer 16 is mounted on the spindle 15 and is movable in an opening 17 relative to a number of indications 18 bearing numbers 16, 19, 22, 24 and 26, which represent the gauges of insulated wires which are to be processed in the apparatus. The indications 18 are placed on a vertical member 19 of the unit 11 adjacent the pointer 16. A clamp 20 is fixedly mounted on the outer end of the spindle 10 and is provided with an arcuate groove 21 in its periphery to receive an end-portion of an insulated wire 22. The arcuate groove 21 continues around a smaller portion 23 of the clamp 20 toward a grooved-stud 24 to which the actual end-portion of the wire 22 may be secured.

The wire 22 extends through a notched guide 26, mounted on the housing 12 and through to another notched guide 27 mounted on the housing 28 of a force applying unit 29. The unit 29 has a commercially known overrunning clutch with an input shaft 30 and an output shaft 31 journalled in suitable bearings mounted in the housing. A holder 32, in the form of a wheel, is mounted on the output shaft 31 and has a groove 33 in its periphery to receive one or more turns of the wire 22. Notches 34 direct the end-portion of the wire out of the groove 33 and about one of the projections 35. Eventually, the wire is moved to grooved-end 36 of the output shaft 31 to which the end-portion of the wire is secured. A ratchet wheel 38 is fixed to the input shaft 30 short of the outer end thereof. A hand lever 40, rotatable on the adjacent end of the shaft 30, carries a pawl 41 to engage teeth of the ratchet 38 to impart rotary movement clockwise to the shaft 30 to impart rotary movement any desired distances in a clockwise direction through the clutch to the shaft 31 and the holder 32.

A cutting unit, indicated generally at 45, is interposed between the units 11 and 29 and has uprights 46 mounted at spaced positions on the base 10. The inner portions of the uprights 46 are recessed at 47 to receive arms 48 and a shaft 49 upon which the lower ends of the arms are mounted. The outer ends of the shaft 49 are journalled in suitable bearings (not shown) in the uprights. Adjustable stops 50, threadedly mounted in apertures of the uprights 46, extend into the recesses 47 to control the operating position of the unit 45 or the forward positions of the arms 48.

The upper ends of the arms 48 have aligned apertures therein through which the ends of a hollow shaft 51 extend. The hollow shaft 51 has an opening 52 therein extending its full length and open to notches 53 in the arms 48. Split collars 54, fixed to the hollow shaft adjacent the inner surfaces of the arms 48, permit rotation of the shaft, but hold the shaft against axial movement. Heads 55, fixedly mounted on the outer ends of the hollow shaft 51, are provided with tapered openings 56 disposed in registration with the opening 52 at the ends of the shaft 51 to serve in assuring registration of the wire with the opening 52 of the shaft. Cutters 58, with sharp inner edges 59, mounted at like positions on the heads 55, are located with their cutting edges measured distances apart to bring about cutting predetermined measured lengths of insulation on the wire.

The wires may vary in size, that is, in gauge, those used in the present instance being indicated at 18 in FIGS. 1 and 2. The clamp 20 is provided with a spring 60, one end being disposed against a stop 61 in the housing 12 while the other end is backed by a pin 62 mounted in the clamp 20 to create increasing tension in the wire as the stretching unit 29 is operated to pull the wire so that the operator will know when each wire has been stretched sufficiently to free the cut length of insulation therefrom.

*Operation*

In preparing the apparatus for operation, the cutting unit 45 is in its open position shown in FIG. 1, after which one end of an insulated wire is secured to the clamp 20, threaded through the notches of the guides 26 and 27, given a suitable number of turns about the holder 32 and secured in place. A pointer 16 is not shown in its normal position. Actually, it should be at its farthest position to the left, FIGS. 1 and 2, resting against the end of the opening 17. When wire is secured in the apparatus the lever 40 is rocked until the pointer 16 registers with the indication 18 corresponding to the gauge of the wire. This action pre-tensions the insulated wire, removes any kinks therein and causes it to lie in a given line between the guides 26 and 27. This action is not sufficient to put any stretch in the wire, but is a predetermined known action for the wires of different gauges to bring them into a straight line between the guides so that like lengths of insulation may be removed. While the wire is held in this position by the clutch the cutting unit 45 is operated moving it in the direction of the arrows so that the insulated wire will be located centrally within the hollow shaft as in FIGS. 2 and 3. When in this position, the hollow shaft may be rotated at least one complete cycle about the wire until the opening 52 in the shaft is returned to its starting position at which time the cutting unit may be returned to its normal position. While the cutting unit was being operated, the cutters 58, illustrated in FIG. 3, were moved through the insulation on the wire cutting it completely at the measured distances, which, in the present instance, is one foot.

When the cutting unit 45 has returned to its open position, the lever 40 is actuated to bring about clockwise rocking motions to the shaft 31 through the pawl 41, the ratchet 38, the shaft 30 and the connecting clutch until the wire breaks. With this known type clutch the shaft 31 may be rotated clockwise but will be held against counterclockwise rotation. Therefore, after the hand lever 40 has been actuated to pre-tension the wire, it may be released during operation of the cutting unit. When the cutting unit is returned to its open position, the lever 40 may be moved rapidly to cause stretching of the wire to free its connections with the inner surface of the length of insulation and to break the wire. In actual practice, the break occurs within the measured length of insulation and the measured length of insulation drops free of the broken ends of the wire.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for stripping measured lengths of insulation from wires of different gauges comprising:

a unit having an indicating means normally urged in one direction and requiring increasing force to move the indicating means increasing distances from a normal position in the opposite direction, a member mounted on the unit adjacent the indicating means and having pre-tension marks disposed at predetermined spaced positions for wires of different known gauges, a clamp for holding one end of an insulated wire mounted on the unit and operatively connected to the indicating means so that pulls of various forces on insulated wires of different gauges to pre-tension the wires will move the indicating means singly to the pre-tension marks, a holder for holding the other end of the wire, an actuator for the holder to cause the holder to apply the force necessary to pre-tension the wire and locate it in a given line, and cutters operable to make end cuts of insulation of the length of the pre-tensioned wire predetermined distances apart, the actuator being adapted to apply additional force to the holder to stretch the wire to reduce its diameter to free the measured length of insulation from the wire and to break the wire to completely free the wire from the measured length of insulation.

2. An apparatus for stripping measured lengths of insulation from wires according to claim 1 in which:

the cutters are mounted on a shaft having an axis and an elongated opening, and means to support the shaft for movement into a cutting position where the axis of the shaft will be coincident with the given line of the wire.

3. An apparatus for stripping measured lengths of insulation from wires according to claim 1 in which:

the cutters are mounted on a shaft having an axis and an elongated opening, means to support the shaft for movement into a cutting position where the axis of the shaft will be coincident with the given line of the wire, and guides to maintain the wire in said given line.

4. An apparatus for stripping measured lengths of insulation from wires according to claim 1 in which:

the cutters are mounted on a shaft having an axis and an elongated opening, means to support the shaft for movement into a cutting position where the axis of the shaft will be coincident with the given line of the wire, heads mounted on the ends of the shaft and having openings therein for receiving the wire, and means to secure the cutters to the heads so that when the shaft with the heads and cutters are moved into the cutting position the cutters will cut through the insulation to the wire, and when the shaft is rotated while in this position the ends of a measured length of insulation are severed.

References Cited in the file of this patent
UNITED STATES PATENTS

| | | |
|---|---|---|
| 2,092,439 | Bouhuys | Sept. 7, 1937 |
| 2,368,763 | Krogel | Feb. 6, 1945 |
| 2,386,928 | Brown | Oct. 16, 1945 |
| 2,929,136 | Andren | Mar. 22, 1960 |
| 2,981,129 | Adams | Apr. 25, 1961 |